United States Patent Office 3,217,038
Patented Nov. 9, 1965

3,217,038
STABILIZATION OF ORGANIC SUBSTANCES
Anthony J. Guarnaccio, Niles, and Ted Symon, Lombard, Ill., assignors to Universal Oil Products Company, Des Plaines, Ill., a corporation of Delaware
No Drawing. Filed Dec. 27, 1961, Ser. No. 162,556
2 Claims. (Cl. 260—570)

This invention relates to the stabilization of organic substances which normally tend to deteriorate in storage, transportation or in use due to oxidation or other reactions.

The present invention is particularly applicable to the stabilization of polyolefins including polyethylene, polypropylene, polybutylene, copolymers of ethylene and propylene, copolymers of ethylene and butylene and copolymers of propylene and butylene, as well as polymers prepared from one or more higher molecular weight olefins. The polyolefins preferably are of high molecular weight, usually having a molecular weight above 1000 and extending into the hundreds of thousand range. The polyolefins may be of the high density, medium density or low density type. Polyethylene is utilized, for example, as a thermoplastic, molding or coating agent. Because of its high dielectric strength and its resistance to water, polyethylene is particularly advantageous for use as insulators or dielectrics in condensers and other similar electronic equipment. Polyethylene plastics also are used in many other applications. Polypropylene, polybutylene and copolymers of ethylene, propylene and/or butylene also are used in electronic equipment, as well as many other applications. When the polyolefin is used in outdoor exposure as, for example, in light weight outdoor furniture, cover for greenhouses, awnings, etc., it is additionally desirable that the polyolefin does not undergo discoloration. The polyolefins are subject to attack by atmospheric oxygen which impairs the desirable properties thereof.

The present invention also is particularly applicable to the stabilization of lubricants, including lubricating oils and greases. These may be either of synthetic or petroleum origin. The synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, pentaerythritol tetrapelargonate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, ethylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propinoate, neopentyl glycol butyrate, neopentyl glycol caproate, neopentyl glycol caprylate, neopentyl glycol pelargonate, etc., (2) trialkylol alkane esters such as the esters of trimethylol alkanes including trimethylolethane, trimethylolpropane, trimethylolbutane, trimethylolpentane, trimethylolhexane, trimethylolheptane, trimethyloloctane, trimethyloldecane, trimethylolundecane, trimethyloldodecane, etc., and particularly triesters in which the ester portions each contain from 3 to 12 carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The synthetic greases generally are referred to as lithium base grease, sodium base grease, calcium base grease, barium base grease, strontium base grease, aluminum base grease, etc. These greases are solid or semi-solid gels and, in general, are prepared by the addition to mineral or synthetic oils of hydrocarbon-soluble metal soaps or salts of higher fatty acids as, for example, lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The present invention also is applicable to the stabilization of fatty materials including the stabilization of edible fats and oils, which may be of animal, vegetable or mineral origin and which tend to become rancid, especially during long periods of storage prior to use. Typical representatives of edible fats and oils include linseed oil, menhaden oil, cod liver oil, castor oil, olive oil, rapeseed oil, coconut oil, palm oil, corn oil, sesame oil, peanut oil, butter, fat, lard, beef, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc.

Other organic substances which deteriorate in storage, during treatment and/or in use, include hydrocarbons, and particularly motor fuels such as saturated and particularly unsaturated gasoline, blends of unsaturated and saturated gasolines, including cracked gasoline, straight run gasoline, polymer gasoline, coker gasoline, alkylate, etc., as well as jet fuel, diesel oil, mineral oil, fuel oil, residual oil, drying oil, waxes, resins, rubber which may be natural or synthetic, etc. These substances are adversely affected by oxygen, with the resultant formation of undesirable gum, discoloration and/or other deleterious reaction products.

In one embodiment the present invention relates to a method of stabilizing an organic substance normally subject to oxidative deterioration which comprises incorporating therein a stabilizing concentration of an inhibitor selected from the group consisting of alkylthioalkyl and arylthioalkyl diaminodiphenylalkanes, diaminodiphenylamines, diaminodiphenylsulfides and diaminodiphenylethers.

In a specific embodiment the present invention relates to a method of stabilizing polyethylene against oxidative deterioration which comprises incorporating therein a stabilizing concentration of 4,4′-bis-(ethylthioethylamino)-diphenylmethane.

In another specific embodiment the present invention relates to a method of stabilizing lubricating grease against oxidative deterioration which comprises incorporating therein a stabilizing concentration of 4-ethylthioethylamino-4′-aminodiphenylmethane.

In another embodiment the present invention relates to an organic substance, particularly polyolefin, lubricating oil and grease, containing a stabilizing concentration of an inhibitor as set forth herein.

The inhibitors of the present invention are believed to be novel compositions of matter and, accordingly, are also being so claimed in the present application.

The novel inhibitors in a preferred embodiment of the present invention may be illustrated by the following general formula:

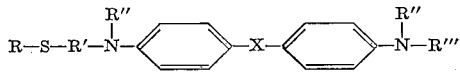

where R is an alkyl or aryl group, S is sulfur, R′ is an alkylene radical, R″ and R‴ are independently selected from the group consisting of hydrogen, alkyl, aryl and alkylthioalkyl radicals, and X is selected from the group consisting of alkane, nitrogen, sulfur and oxygen.

Of the alkylthioalkyl diaminodiphenylalkanes, a preferred inhibitor is 4,4′-bis-(ethylthioethylamino)-diphenylmethane. Other inhibitors include 4,4′-bis-(methylthiomethylamino)-diphenylmethane,
4,4′-bis-(methylthioethylamino)-diphenylmethane,
4,4′-bis-(methylthiopropylamino)-diphenylmethane,
4,4′-bis-(methylthiobutylamino)-diphenylmethane,
4,4′-bis-(methylthioamylamino)-diphenylmethane,
4,4′-bis-(methylthiohexylamino)-diphenylmethane,
4,4′-bis-(methylthioheptylamino)-diphenylmethane,
4,4′-bis-(methylthiooctylamino)-diphenylmethane, etc.,
4,4′-bis-(ethylthiomethylamino)-diphenylmethane,
4,4′-bis-(ethylthiopropylamino)-diphenylmethane,
4,4′-bis-(ethylthiobutylamino)-diphenylmethane,
4,4′-bis-(ethylthioamylamino)-diphenylmethane,
4,4′-bis-(ethylthiohexylamino)-diphenylmethane,
4,4′-bis-(ethylthioheptylamino)-diphenylmethane,
4,4′-bis-(ethylthiooctylamino)-diphenylmethane, etc.,
4,4′-bis-(propylthiomethylamino)-diphenylmethane,
4,4′-bis-(propylthioethylamino)-diphenylmethane,
4,4′-bis-(propylthiopropylamino)-diphenylmethane,
4,4′-bis-(propylthiobutylamino)-diphenylmethane,
4,4′-bis-(propylthioamylamino)-diphenylmethane,
4,4′-bis-(propylthiohexylamino)-diphenylmethane,
4,4′-bis-(propylthioheptylamino)-diphenylmethane,
4,4′-bis-(propylthiooctylamino)-diphenylmethane, etc.,
4,4′-bis-(butylthiomethylamino)-diphenylmethane,
4,4′-bis-(butylthioethylamino)-diphenylmethane,
4,4′-bis-(butylthiopropylamino)-diphenylmethane,
4,4′-bis-(butylthiobutylamino)-diphenylmethane,
4,4′-bis-(butylthioamylamino)-diphenylmethane,
4,4′-bis-(butylthiohexylamino)-diphenylmethane,
4,4′-bis-(butylthioheptylamino)-diphenylmethane,
4,4′-bis-(butylthiooctylamino)-diphenylmethane, etc.,
4,4′-bis-(amylthiomethylamino)-diphenylmethane,
4,4′-bis-(amylthioethylamino)-diphenylmethane,
4,4′-bis-(amylthiopropylamino)-diphenylmethane,
4,4′-bis-(amylthiobutylamino)-diphenylmethane,
4,4′-bis-(amylthioamylamino)-diphenylmethane,
4,4′-bis-(amylthiohexylamino)-diphenylmethane,
4,4′-bis-(amylthioheptylamino)-diphenylmethane,
4,4′-bis-(amylthiooctylamino)-diphenylmethane, etc.,
4,4′-bis-(hexylthiomethylamino)-diphenylmethane,
4,4′-bis-(hexylthioethylamino)-diphenylmethane,
4,4′-bis-(hexylthiopropylamino)-diphenylmethane,
4,4′-bis-(hexylthiobutylamino)-diphenylmethane,
4,4′-bis-(hexylthioamylamino)-diphenylmethane,
4,4′-bis-(hexylthiohexylamino)-diphenylmethane,
4,4′-bis-(hexylthioheptylamino)-diphenylmethane,
4,4′-bis-(hexylthiooctylamino)-diphenylmethane, etc.,
4,4′-bis-(heptylthiomethylamino)-diphenylmethane,
4,4′-bis-(heptylthioethylamino)-diphenylmethane,
4,4′-bis-(heptylthiopropylamino)-diphenylmethane,
4,4′-bis-(heptylthiobutylamino)-diphenylmethane,
4,4′-bis-(heptylthioamylamino)-diphenylmethane,
4,4′-bis-(heptylthiohexylamino)-diphenylmethane,
4,4′-bis-(heptylthioheptylamino)-diphenylmethane,
4,4′-bis-(heptylthiooctylamino)-diphenylmethane, etc.,
4,4′-bis-(octylthiomethylamino)-diphenylmethane,
4,4′-bis-(octylthioethylamino)-diphenylmethane,
4,4′-bis-(octylthiopropylamino)-diphenylmethane,
4,4′-bis-(octylthiobutylamino)-diphenylmethane,
4,4′-bis-(octylthioamylamino)-diphenylmethane,
4,4′-bis-(octylthiohexylamino)-diphenylmethane,
4,4′-bis-(octylthioheptylamino)-diphenylmethane,
4,4′-bis-(octylthiooctylamino)-diphenylmethane, etc.

In another embodiment, the alkyl and/or alkylene groups may contain more than 8 carbon atoms each, and thus would be selected from nonyl, decyl, undecyl, dodecyl, tridecyl, tetradecyl, pentadecyl, hexadecyl, heptadecyl, octadecyl, nonadecyl, eicosyl, etc., or the corresponding alkylene radicals. Also, while specific substituted diaminodiphenylmethanes are enumerated above, it is understood that correspondingly substituted diaminodiphenylmethanes, propanes, butanes, hexanes, heptanes, octanes, etc. are used in accordance with the present invention.

In another embodiment, the alkylthioalkyl diaminodiphenylalkane comprises an alkylthioalkylamino aminodiphenylalkane. A preferred inhibitor in this embodiment is 4-ethylthioethylamino-4′-aminodiphenylmethane. Other inhibitors of this class include 4-methylthiomethyl-amino-4′-aminodiphenylmethane,
4-methylthioethylamino-4′-aminodiphenylmethane,
4-methylthiopropylamino-4′-aminodiphenylmethane,
4-methylthiobutylamino-4′-aminodiphenylmethane,
4-methylthioamylamino-4′-aminodiphenylmethane,
4-methylthiohexylamino-4′-aminodiphenylmethane,
4-methylthioheptylamino-4′-aminodiphenylmethane,
4-methylthio-octylamino-4′-aminodiphenylmethane, etc.,
4-ethylthiomethylamino-4′-aminodiphenylmethane,
4-ethylthiopropylamino-4′-aminodiphenylmethane,
4-ethylthiobutylamino-4′-aminodiphenylmethane,
4-ethylthioamylamino-4′-aminodiphenylamethane,
4-ethylthiohexylamino-4′-aminodiphenylmethane,
4-ethylthioheptylamino-4′-aminodiphenylmethane,
4-ethylthiooctylamino-4′-aminodiphenylmethane, etc.,
4-propylthiomethylamino-4′-aminodiphenylmethane,
4-propylthioethylamino-4′-aminodiphenylmethane,
4-propylthiopropylamino-4′-aminodiphenylmethane,
4-propylthiobutylamino-4′-aminodiphenylmethane
4-propylthioamylamino-4′-aminodiphenylmethane,
4-propylthiohexylamino-4′-aminodiphenylmethane
4-propylthioheptylamino-4′-aminodiphenylmethane,
4-propylthiooctylamino-4′-aminodiphenylmethane, etc.,
4-butylthiomethylamino-4′-aminodiphenylmethane,
4-butylthioethylamino-4′-aminodiphenylmethane,
4-butylthiopropylamino-4′-aminodiphenylmethane,
4-butylthiobutylamino-4′-aminodiphenylmethane,
4-butylthioamylamino-4′-aminodiphenylmethane,
4-butylthiohexylamino-4′-aminodiphenylmethane,
4-butylthioheptylamino-4′-aminodiphenylmethane,
4-butylthiooctylamino-4′-aminodiphenylmethane, etc.,
4-amylthiomethylamino-4′-aminodiphenyl-methane,
4-amylthioethylamino-4′-aminodiphenylmethane,
4-amylthiopropylamino-4′-aminodiphenylmethane,
4-amylthiobutylamino-4′-aminodiphenylmethane,
4-amylthioamylamino-4′-aminodiphenylmethane,
4-amylthiohexylamino-4′-aminodiphenylmethane,
4-amylthioheptylamino-4′-aminodiphenylmethane,
4-amylthiooctylamino-4′-aminodiphenylmethane, etc.,
4-hexylthiomethylamino-4′-aminodiphenylmethane,
4-hexylthioethylamino-4′-aminodiphenylmethane, 4-hexylthiopropylamino-4'-aminodiphenylmethane,
4-hexylthiobutylamino-4'-aminodiphenylmethane,
4-hexylthioamylamino-4'-aminodiphenylmethane,
4-hexylthiohexylamino-4'-aminodiphenylmethane,
4-hexylthioheptylamino-4'-aminodiphenylmethane,
4-hexylthiooctylamino-4'-aminodiphenylmethane, etc.,
4-heptylthiomethylamino-4'-aminodiphenylmethane,
4-heptylthioethylamino-4'-aminodiphenylmethane,
4-heptylthiopropylamino-4'-aminodiphenylmethane,
4-heptylthiobutylamino-4'-aminodiphenylmethane,
4-heptylthioamylamino-4'-aminodiphenylmethane,
4-heptylthiohexylamino-4'-aminodiphenylmethane,
4-heptylthioheptylamino-4'-aminodiphenylmethane,
4-heptylthiooctylamino-4'-aminodiphenylmethane, etc.,
4-octylthiomethylamino-4'-aminodiphenylmethane,
4-octylthioethylamino-4'-aminodiphenylmethane,
4-octylthiopropylamino-4'-aminodiphenylmethane,
4-octylthiobutylamino-4'-aminodiphenylmethane,
4-octylthioamylamino-4'-aminodiphenylmethane,
4-octylthiohexylamino-4'-aminodiphenylmethane,
4-octylthioheptylamino-4'-aminodiphenylmethane,
4-octylthiooctylamino-4'-aminodiphenylmethane, etc.

Here again, it is understood that the alkyl and/or alkylene group may contain a higher number of carbon atoms which generally will not be more than about 20 carbon atoms each, also, it is understood that the correspondingly substituted diphenylethanes, diphenylpropanes, diphenlybutanes, diphenylhexanes, diphenylheptanes, diphenyloctanes, etc. are used in accordance with the present invention.

Of the alkylthioalkyl diaminodiphenylamines, preferred inhibitors are 4,4'-bis - (ethylthioethylamino) - diphenylamine and 4-ethyltioethylamino-4'-aminodiphenylamine. Other compounds in this embodiment include alkylthioalkyl diaminodiphenylamines containing the specific substituents hereinbefore recited in the description of the alkylthioalkyl diaminodiphenylmethanes and all such correspondingly substituted alkylthioalkyl diaminodiphenylamines are specifically included in the present invention. It would unnecessary encumber the present specifications to repeat all of these specific compounds when their identities are readily ascertained by substituting diphenylamine for diphenylmethane in the compounds specifically recited hereinbefore. In the interest of brevity, only a few of such compounds are recited below, with the clear understanding that these are merely illustrative and not limiting. These illustrative compounds include 4,4'-bis-(methylthiomethylamino) - diphenylamine, 4,4'- - bis-(ethylthiomethylamino) - diphenylamine, 4,4'-bis-(methylthioethylamino)-diphenylamine, 4,4' - bis-(methylthiopropylamino) - diphenylamine, 4,4'-bis-(methylthiobutylamino)-diphenylamine, 4,4'-bis-(ethylthiopropylamino)-diphenylamine, 4,4'-bis-(ethylthiobutylamino)-diphenylamine, 4,4'-bis-(propylthiopropylamino)-diphenylamine, 4,4'-bis-(propylthiobutylamino)-diphenylamine, 4,4'-bis-(butylthiobutylamino)-diphenylamine, 4,4'-bis - (butylthioamylamino)-diphenylamine, etc., 4-methylthiomethylamino - 4' - aminodiphenylamine, 4-ethylthiomethylamino-4'-aminodiphenylamine, 4 - methylthioethylamino-4'-aminodiphenylamine, 4-methylthiopropylamino-4' - aminodiphenylamine, 4 - methylthiobutylamino-4'-aminodiphenylamine, 4-ethylthiopropylamino-4'-aminodiphenylamine, 4-ethylthiobutylamino-4' - aminodiphenylamine, 4-propylthiopropylamino-4'-aminodiphenylamine, 4 - propylthiobutylamino-4' - aminodiphenylamine, 4 - butylthiobutylamino-4'-aminodiphenylamine, 4-butylthioamylamino-4'-aminodiphenylamine, etc. Here again, it is understood that higher molecular weight alkyl and/or alkylene groups are usable as described in connection with the substituted diaminodiphenylalkanes.

Of the alkylthioalkyl diaminodiphenylsulfides, preferred inhibitors are 4,4'-bis-(ethylthioethylamino)-diphenylsulfide and 4-ethylthioethylamino - 4'-aminodiphenylsulfide. Other compounds in this embodiment include alkylthioalkyl diaminodiphenylsulfides containing the specific substituents hereinbefore recited in the description of the alkylthioalkyl diaminodiphenylmethanes, and all such correspondingly substituted alkylthioalkyl diaminodiphenylsulfides are specifically included in the present invention. As mentioned previously, it would unnecessarily encumber the present specifications to repeat all of these specific compounds when their identities are readily ascertained by substituting diphenylsulfide for diphenylmethane in the compounds specifically recited hereinbefore. Merely for illustrative purposes, the following few of such compounds are specifically set forth as 4,4'- - bis - (methylthiomethylamino) - diphenylsulfide, 4,4'-bis-(ethylthiomethylamino)diphenylsulfide, 4,4'-bis-(methylthioethylamino) - diphenylsulfide, 4,4'-bis - (methylthiopropylamino)-diphenylsulfide, 4,4'-bis-(methylthiobutylamino)-diphenylsulfide, 4,4'-bis - (ethylthiopropylamino)-diphenylsulfide, 4,4'-bis - (ethylthiobutylamino)-diphenylsulfide, 4,4'-bis - (propylthiopropylamino)diphenylsulfide, 4,4'-bis - (propylthiobutylamino) - diphenylsulfide, 4,4'-bis-(butylthiobutylamino)-diphenylsulfide, 4,4'-bis-(butylthioamylamino)-diphenylsulfide, etc., 4-methylthiomethylamino-4'-aminodiphenylsulfide, 4 - ethylthiomethylamino - 4' - aminodiphenylsulfide, 4 - methylthioethylamino-4'-aminodiphenylsulfide, 4-methylthiopropylamino-4'-aminodiphenylsulfide, 4-methylthiobutylamino-4'-aminodiphenylsulfide, 4 - ethylthiopropylamino-4'-aminodiphenylsulfide, 4 - ethylthiobutylamino - 4'-aminodiphenylsulfide, 4-propylthiopropylamino-4'-aminodiphenylsulfide, 4-propylthiobutylamino-4'-aminodiphenylsulfide, 4-butylthiobutylamino-4' - aminodiphenylsulfide, 4-butylthioamylamino-4'-aminodiphenylsulfide, etc.

Of the alkylthioalkyl diaminodiphenylethers, preferred inhibitors are 4,4'-bis-(ethylthioethylamino)-diphenylether and 4 - ethylthioethylamino - 4' - aminodiphenylether. Other compounds in this embodiment include alkylthioalkyl diaminodiphenylether containing the specific substituents hereinbefore recited in the description of the alkylthioalkyl diaminodiphenylmethanes, and all such correspondingly substituted alkylthioalkyl diaminodiphenylethers are specifically included in the present invention. As mentioned previously, it would unnecessarily encumber the present specifications to repeat all of these specific compounds when their identities are readily ascertained by substituting diphenylethers for diphenylmethane in the compounds specifically recited hereinbefore. Merely for illustrative purposes, the following few of such compounds are specifically set forth as 4,4'-bis-(methylthiomethylamino) - diphenylether, 4,4'-bis-(ethylthiomethylamino)-diphenylether, 4,4'-bis-(methylthioethylamino)-diphenylether, 4,4'-bis-(methylthiopropylamino)-diphenylether, 4,4'-bis-(butylthioamylamino)-diphenylether, 4,4'-bis-(methylthiobutylamino) - diphenylether, 4,4'-bis-(ethylthiopropylamino) - diphenylether, 4,4'-bis - (ethylthiobutylamino) - diphenylether, 4,4'-bis-(propylthiopropylamino) - diphenylether, 4,4'-bis - (propylthiobutylamino)-diphenylether, 4,4'-bis-(butylthio-butylamino)-diphenylether, 4,4'-bis-(butylthiomaylamino)-diphenylether, etc., 4-methylthiomethylamino-4'-aminodiphenylether, 4-ethylthiomethylamino-4' - aminodiphenylether, 4-methylthioethylamino-4'-aminodiphenylether, 4-methylthiopropylamino-4'-aminodiphenylether, 4-methylthiobutylamino-4' - aminodiphenylether, 4-ethylthiopropylamino-4'-aminodiphenylether, 4-ethylthiobutylamino-4'-aminodiphenylether, 4-propylthiopropylamino-4'-aminodiphenylether, 4-propylthiobutylamino-4'-aminodiphenylether, 4-butylthiobutylamino-4'-aminodiphenylether, 4-butylthioamylamino-4'-aminodiphenylether, etc.

In general the 4- or the 4,4'- alkylthioakyl diaminodiphenyl alkanes, amines, sulfides and ethers are preferred. However, in another embodiment of the invention, these substitutions may be in the 2- position, in the 2,2'- positions or in the 2,4'- positions.

From the description hereinbefore set forth, it will be seen that a number of different compounds may be used in accordance with the present invention. However, it is understood that all of these compounds are not necessarily equivalent in their activity in a particular organic substance. However, all of these compounds containing the alkylthioalkyl diaminodiphenyl compound configuration will be effective in retarding oxidation of organic substances. Also, it is understood that a mixture of the inhibitors may be used.

The inhibitors of the present invention may be prepared in any suitable manner. The preparations of a number of these inhibitors are set forth in the examples appended to the present specification. It is understood that other alkylthioalkyl substituted compounds may be prepared by the same general methods.

In general, the inhibitor of the present invention will be used in the organic substance in a concentration of from about 0.0001% to about 5% by weight of the organic substance, although in some cases higher or lower concentrations may be employed. The exact concentration to be used will depend upon the particular organic substance being treated. In most cases, concentrations of from about 0.01% to about 2% by weight generally will be employed.

It is understood that the inhibitor of the present invention may be used along with other additives incorporated in the organic substance. For example, in grease the inhibitor may be used along with higher alcohols, esters, organic amines, polybutene, sulfurized fatty materials, sulfur chlorine compounds, molybdenum disulfide, dyes, perfumed materials, fillers, etc. In lubricating oil, the inhibitor may be used along with one or more of the above additives and/or viscosity index improver, pourpoint depressor, anti-foaming agent, detergent, lubricity or extreme pressure additive, etc. In polymers, such as polyolefins, the inhibitor is used along with one or more of dyes, pigments, anti-static agents, plasticizers, ultraviolet light stabilizers, etc. In some cases, it may be of advantage to also include a metal deactivator as, for example, disalicylal diamino propane, ethylene diamine tetracetic acid tetrasodium salt, etc., or to include other additives such as tricresyl phosphate, trialkyl phenols including 2,6-di-tert-butyl-4-methylphenol, 2,4-dimethyl-6-tert-butylphenol, alkylated diphenyl amines, phenyl naphthyl amines, dialkyl phenylene diamines, phenothiazine, organic selenium compounds, etc. When desired, the inhibitor of the present invention may be prepared as a mixture with one or more of these other additives and incorporated in this manner in the organic substance.

Also, it is understood that the inhibitor of the present invention may be prepared as a solution in a suitable solvent including hydrocarbons, alcohols, ketones, etc. In some cases, the same solvent used for the inhibitor of the present invention may be used for one or more of the other additives to be incorporated in the organic substance. In another method, the inhibitor of the present invention may be prepared as a stock solution in a small quantity of the organic substance and the stock solution then is incorporated into the major quantity of the organic substances.

The inhibitor of the present invention may be incorporated in the organic substance in any suitable manner and at any suitable stage of preparation. For example, in an organic substance which comprises a mixture of several components as, for example, grease, the inhibitor may be added to one or more of the components of the grease prior to compositing and processing thereof, or it may be added to the mix at any time, preferably before final processing in order to obtain intimate mixing and dissolving of the inhibitor in the grease.

The following examples are introduced to illustrate further the novelty and utility of the present invention, but not with the intention of unduly limiting the same.

EXAMPLE I

The inhibitor of this example is 4-ethylthioethylamino-4'-aminodiphenylmethane and was prepared as follows: 50 g. of 4,4'-diaminodiphenylmethane was dissolved in 100 cc. of benzene and 93 g. of pyridine. The above solution was mechanically stirred and 63 g. of $\beta$-chloroethyl ethylsulfide was added dropwise thereto. The mixture was refluxed for 8 hours, cooled, stirred and washed 3 times with 10% hydrochloric acid solution, neutralized, extracted with 10% sodium hydroxide solution and finally extracted with ether. The extract was dried and distilled to recover 4-ethylthioethylamino-4'-aminodiphenylmethane as the overhead. The product had a boiling point of 220° C. at 0.4 mm., a melting point of 46–50° C., a sulfur content of 9.94% and a basic nitrogen content of 9.68%.

EXAMPLE II

The inhibitor of this example is 4,4'-bis-(ethyl-thioethylamino)-diphenylmethane and was prepared in substantially the same manner as described in Example I, except that dimethyl sulfoxide was used as the solvent instead of pyridine, the reaction was effected at room temperature and different mol proportions of reactants were used. 99 g. (0.5 mol) of 4,4'-diaminodiphenylmethane, 125 g., 1 mol) of $\beta$-chloroethyl ethylsulfide and 250 cc. of dimethyl sulfoxide solvent were stirred at room temperature for 8 hours. 4,4'-bis-(ethylthioethylamino)-diphenylmethane was recovered as a red oil having an equivalent weight of 172 and a sulfur content of 16.8%. This corresponds to the theoretical equivalent weight of 187 and sulfur content of 17.1%.

EXAMPLE III 4,4'-bis-(ethylthioethylamino)-diphenylmethane also was prepared by refluxing for 8 hours 10 g. A0.05 mol) of 4,4'-diaminodiphenylmethane, 125 g. (1 mol) of $\beta$-chloroethyl ethylsulfide and 500 cc. of benzene solvent.

EXAMPLE IV 4,4'-bis-(ethylthioethylamino)-diphenylmethane also was prepared by refluxing for 8 hours 10 g. (0.05 mol) 4,4'-diaminodiphenylmethane, 13 g. (0.1 mol) of $\beta$-chloroethyl ethylsulfide and 125 cc. of absolute (ethyl) alcohol.

EXAMPLE V 2-ethylthiomethylamino-2'-aminodiphenylethane is prepared by refluxing for 10 hours equal mol proportions of 2,2'-diaminodiphenylethane and chloromethyl ethylsulfide using absolute (ethyl) alcohol solvent.

EXAMPLE VI 4,4'-bis-(butylthioethylamino)-diphenylpropane is prepared by reacting 1 mol proportion of 4,4'-diaminodiphenylpropane and 2 mol proportions of $\beta$-chloroethyl butylsulfide in the presence of dimethyl sulfoxide solvent for 14 hours.

EXAMPLE VII 2-methylthioethylamino-4'-aminodiphenylamine is prepared by refluxing for 12 hours equal mol proportions of 2,4'-diaminodiphenylamine and $\beta$-chloroethyl methylsulfide using absolute alcohol solvent.

EXAMPLE VIII 4,4'-bis-(propylthioethylamino)-diphenylamine is prepared by refluxing for 14 hours 1 mol proportion of 4,4'-diaminodiphenylamine and 2 mol proportions of $\beta$-chloroethyl propylsulfide in the presence of absolute alcohol solvent. In order to insure complete reaction, a slight excess of the chloroethyl propylsulfide is used.

EXAMPLE IX 2-hexylthiopropylamino-4'-aminodiphenylsulfide is prepared by reacting equal mol proportions of 2,4'-diaminodiphenylsulfide and $\gamma$-chloropropyl hexylsulfide in the presence of toluene solvent under refluxing conditions for 10 hours.

EXAMPLE X 4,4' - bis - (ethylthioethylamino) - diphenylsulfide is prepared by reacting 1 mol proportion of 4,4'-diaminodihpenylsulfide and 2 mol proportions of β-chloroethyl ethylsulfide in the presence of absolute (ethyl) alcohol solvent under refluxing conditions for 16 hours.

EXAMPLE XI

4 - ethylthioethylamino - 4' - aminodiphenylether is prepared by intimately stirring at room temperature for 20 hours equal mol proportions of 4,4'-diaminodiphenylether and β-chloroethyl ethylsulfide using dimethyl sulfoxide solvent.

EXAMPLE XII 2,4' - bis - (propylthiomethylamino) - diphenylether is prepared by reacting 1 mol proportion of 2,4'-diaminodiphenylether and 2 mol proportions of chloromethyl propylsulfide using absolute alcohol solvent. The reaction is effected by refluxing the mixture for 18 hours, after which the solvent is removed and the product is recovered as a distillation residue.

EXAMPLES XIII

Samples of the 4,4' - bis - (ethylthioethylamino) - diphenylmethane, prepared as described in Examples II and III, were evaluated as antioxidants in polyethylene. The polyethylene used in this example is of high density and marketed under the trade name of "Fortiflex" by the Celanese Corporation of America. In the samples containing inhibitor, the inhibitor was used in a concentration of 0.07% by weight of the polyethylene and was incorporated therein by milling. The different samples of polyethylene were evaluated in a method similar to that described by Hawkins, Hansen, Matreyek and Winslow in Rubber Chemistry and Technology, October-November, 1959, pages 1164–1170, except that an electrically heated aluminum block rather than an oven was used to maintain the desired temperature. The oxygen absorption of the sample was determined manometrically rather than volumetrically. In this method, samples of the polyethylene weighing about 0.5 g. are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individaul manometers containing mercury and the differential pressure is periodically determined. The induction period is taken as the number of hours required to reach a pressure differential of 20 cm. Hg.

The following table reports the results of a sample of the polyethylene without inhibitor, a sample of the polyethylene containing the inhibitor of Example II and a sample of the polyethylene containing the inhibitor of Example III.

*Table I*

| Run No. | Inhibitor | Induction period, hours to P of 20 cm. Hg |
| --- | --- | --- |
| 1 | None | 7.5 |
| 2 | Inhibitor of Example II | 343 |
| 3 | Inhibitor of Example III | 354 |

From the data in the above table, it will be seen that the inhibitor of the present invention, prepared by using different solvents, was very effective in extending the induction period of the polyethylene.

EXAMPLE XIV

4 - ethylthioethylamino - 4' - aminodiphenylmethane (inhibitor of Example I) and 4,4' - bis - (ethylthioethylamino) - diphenylmethane (inhibitor of Example III) were evaluated as inhibitors in grease. The grease is a lithium grease and is prepared by mixing 91% by weight of highly refined lubricating oil with 8% by weight of lithium stearate. The mixture is heated at about 232° C. while agitating the same. Subsequently, the grease is cooled while agitating to 160° C. and, at this temperature, 0.3% by weight of the inhibitor is added. Agitation is continued, and the mixture is allowed to cool to about 120° C. and the grease then is further cooled slowly to room temperature.

The stability of the grease is tested according to a modified Norma Hoffmann method, in which a sample of the grease is placed in a bomb and oxygen is charged thereto. The bomb then is heated to 100° C. and the time required for a drop of 5 pounds pressure is taken as the induction period. The results of these evaluations are reported in the following table:

*Table II*

| Run No. | Inhibitor | Induction period, hours |
| --- | --- | --- |
| 4 | None | 9 |
| 5 | Inhibitor of Example I | 195 |
| 6 | Inhibitor of Example III | 207 |

From the data in the above table, it will be seen that the inhibitors of the present invention were extremely effective in retarding oxidative deterioration of the grease.

EXAMPLE XV 4-ethylthioethylamino - 4' - aminodiphenylmethane also was evaluated in dioctyl sebacate marketed under the trade name of "Plexol 201." This synthetic lubricating oil is being used commercially on a comparatively large scale.

The lubricating oil was evaluated in accordance with a standard oxygen stability test, in which a 100 cc. sample of the lubricating oil is placed in a bath maintained at 400° F. and air is blown therethrough at a rate of 5 liters of air per hour. The sample of lubricating oil is examined periodically and the time to reach an acid number of 5 is reported. It is apparent that the longer the time required to reach an acid number of 5, the more stable is the sample of lubricating oil. In other words, it takes longer for the more stable oil to deteriorate.

The results of this run, as well as the results of a sample of the lubricating oil without inhibitor, are reported in the following table.

*Table III*

| Run No. | Inhibitor | Hours to acid number of 5 |
| --- | --- | --- |
| 7 | None | 9 |
| 8 | 1% by weight of inhibitor of Example I | 30 |

From the data in the above table, it will be noted that the inhibitor of the present invention was effective in stabilizing the lubricating oil.

EXAMPLE XVI 2,4'-bis-(propylthiomethylamino) - diphenylether, prepared as described in Example XII, is used as an inhibitor in a synthetic lubricating oil consisting of mixed esters of trimethylolpropane. The lubricating oil is available commercially under the trade name of "Cellutherm." Typical properties of this lubrication oil are set forth below:

| | |
| --- | --- |
| Specific gravity, 60/60° F. | 0.965 |
| Acidity, mg./KOH/g. | 0.03 |
| Color, ASTM | 2 |
| Fire point, COC, ° F. | 520 |
| Flash point, COC, ° F. | 460 |
| Hydrolysis number | 0.27 |
| Viscosity at −65° F. cs. | 14,900 |
| at 100° F., SSU | 76.93 |
| at 210° F., SSU | 37.77 |

The lubricating oil is evaluated in accordance with the standard oxygen stability test as described in Example XV. The inhibitor is used in a concentration of 0.0033 mol per 100 cc. of lubricating oil, which is approximately 0.8% by weight of the lubricating oil.

EXAMPLE XVII

2 - hexylthiopropylamino-4'-aminodiphenylsulfide, prepared as described in Example IX, is incorporated in a concentration of 0.5% by weight in grease. This is effected in substantially the same manner as described in Example XIV. A sample of the grease containing the inhibitor then is evaluated in accordance with the modified Norma Hoffmann method described in Example XIV.

EXAMPLE XVIII

4 - ethylthioethylamino-4'-aminodiphenylamine is prepared by the reaction of equal mol proportions of 4,4'-diaminodiphenylamine and β-chloroethyl ethylsulfide in the presence of absolute alcohol solvent. The reaction is effected by refluxing the mixture for 12 hours, following which the solvent is removed and the inhibitor is recovered by distillation.

4-ethylthioethylamino-4'aminodiphenylamine, prepared in the above manner, is used as an inhibitor in polypropylene. The inhibitor is incorporated in a concentration of 0.5% by weight during milling of the polypropylene.

Examples I through XII and Example XVIII describe the preparation of specific compounds by the general method of reacting the diaminodiphenylalkane, diaminodiphenylamine, diaminodiphenylsulfide or diaminodiphenylether with a haloalkyl alkylsulfide, either with intimate stirring at atmospheric temperature or by refluxing, preferably with intimate stirring. It is understood that the details of the specific preparations of the examples may be varied in the preparation of these or other compounds of the invention. In general, the time of reaction will range from about 4 to 24 hours or more, and usually will range from 6 to 12 hours. The reflux temperature will depend upon the specific solvent employed and may range from 80° C. to 200° C. but should be below the boiling point of the reactants, the haloalkyl alkylsulfide usually being the lower boiling reactant and therefore, the reflux temperature should be below the boiling point of this reactant. Instead of the chloroalkyl alkylsulfide, it is understood that the corresponding bromoalkyl alkylsulfide or iodoalkyl alkylsulfide may be used.

While benzene has been illustrated as the solvent, it is understood that other suitable aromatic hydrocarbons may be used, including, for example, toluene, xylene, etc. In another embodiment, paraffinic solvents may be employed including, for example, pentane, hexane, heptane, octane, etc. or mixtures thereof. When using the hydrocarbon solvent, it may be desirable to also use a halogen acceptor and, preferably a tertiary amine including, for example, pyridine, dimethylaniline, diethylaniline, dipropylaniline, triisopropylamine, triisobutylamine, etc. Instead of ethyl alcohol, methyl alcohol, propyl alcohol, butyl alcohol, amyl alcohol, hexyl alcohol, etc. may be employed.

Following the reaction, the reaction mixture may be finished in any suitable manner to recover the desired product. When a tertiary amine is used, the reaction mixture preferably is washed with hydrochloric acid or other suitable acid to remove the tertiary amine. The reaction mixture then is neutralized with any suitable caustic material, including sodium hydroxide, potassium hydroxide, etc. In most cases, it is desirable to extract the product from the reaction mixture with a suitable solvent including, for example, ether, benzene, hexane, heptane, etc. The extract preferably is dried in any suitable manner, including the use of sodium sulfate, calcium chloride, etc. The product then is recovered by distillation, either as the overhead or as the residue, depending upon the boiling point of the specific product.

The above method of preparation generally is preferred. However, it is understood that any other suitable method of preparing these compounds may be employed. In another method, the diaminodiphenylalkane, diaminodiphenylamine, diaminodiphenylsulfide or diaminodiphenylether is reacted with a dihaloalkane as, for example, dichloromethane, dichloroethane, dichloropropane, dichlorobutane, etc., dibromomethane, dibromoethane, dibromopropane, dibromobutane, etc., diiodomethane, diiodoethane, diiodopropane, diiodobutane, etc. to form the corresponding haloalkyl diaminodiphenyl compound and then is reacted with a mercaptan including, for example, methyl mercaptan, ethyl mercaptan, propyl mercaptan, butyl mercaptan, amyl mercaptan, hexyl mercaptan, etc. in the presence of sodium hydroxide, potassium hydroxide, etc. to form the desired alkylthioalkyl diaminodiphenyl compound or the bis-(alkylthioalkylamino)-diphenyl compound.

In a preferred embodiment, the compounds of the present invention are alkylthioalkyl diaminodiphenylalkanes, diaminodiphenylamines, diaminodiphenylsulfides and diaminodiphenylethers. In another embodiment, the compounds are prepared by reacting a haloalkyl arysulfide with the diaminodiphenyl compound. For example, 4-phenylthioethylamino-4'-aminodiphenylmethane is prepared by refluxing equal mol proportions of β-chloroethyl phenylsulfide with 4,4'-diaminodiphenylmethane. Similarly, 4,4'-bis-(phenylthioethylamino)-diphenylmethane is prepared by reacting 2 mol proportions of β-chloroethyl phenylsulfide with 1 mol proportion of 4,4'-diaminodiphenylmethane. These reactions are effected in the same general manner as hereinbefore described in detail. Other illustrative compounds of this embodiment of the present invention are prepared by the same general methods and include, as illustrative but not as limiting, the following compounds:

4-phenylthiomethylamino-4'-aminodiphenylmethane,
4-phenylthiopropylamino-4'-aminodiphenylmethane,
4-phenylthiobutylamino-4'-aminodiphenylmethane, etc.,
4-tolylthiomethylamino-4'-aminodiphenylmethane,
4-tolythioethylamino-4'-aminodiphenylmethane,
4-tolylthiopropylamino-4'-aminodiphenylmethane,
4-tolylthiobutylamino-4'-aminodiphenylmethane, etc.,
4-xylylthiomethylamino-4'-aminodiphenylmethane,
4-xylylthioethylamino-4'-aminodiphenylmethane,
4-xylylthiopropylamino-4'-aminodiphenylmethane,
4-xylylthiobutylamino-4'-aminodiphenylmethane, etc.,
4,4'-bis-(phenylthiomethylamino)-diphenylmethane,
4,4'-bis-(phenylthioethylamino)-diphenylmethane,
4,4'-bis-(phenylthiopropylamino)-diphenylmethane,
4,4'-bis-(phenylthiobutylamino)-diphenylmethane, etc.,
4,4'-bis-(tolylthiomethylamino)-diphenylmethane,
4,4'-bis-(tolylthioethylamino)-diphenylmethane,
4,4'-bis-(tolylthiopropylamino)-diphenylmethane,
4,4'-bis-(tolylthiobutylamino)-diphenylmethane, etc.,
4,4'-bis-(xylylthiomethylamino)-diphenylmethane,
4,4'-bis-(xylylthioethylamino)-diphenylmethane,
4,4'-bis-(xylylthiopropylamino)-diphenylmethane,
4,4'-bis-(xylylthiobutylamino)-diphenylmethane, etc., similarly substituted diaminodiphenylethanes, diaminodiphenylpropanes, diaminodiphenylbutanes, diaminodiphenylpentanes, diaminodiphenylhexanes, etc., diaminodiphenylamines, diaminodiphenylsulfides and diaminodiphenylethers.

In the embodiments of the invention relating to the alkylthioalkyl diaminodiphenyl compounds and the arylthioalkyl diaminodiphenyl compounds, a modification comprised within the scope of the present invention includes compounds in which the free amino group contains alkyl or aryl substitutions. Illustrative compounds in this modification include 4-methylthiomethylamino-4'-methylaminodiphenyl-
  methane,
4-ethylthioethylamino-4'-methylaminodiphenyl-
  methane,
4-ethylthioethylamino-4'-ethylaminodiphenylmethane,
4-propylthiopropylamino-4'-propylaminodiphenyl-
  methane, etc.,
4-methylthiomethylamino-4'-methylaminodiphenyl-
  ethane,
4-ethylthioethylamino-4'-methylaminodiphenylethane,
4-ethylthioethylamino-4'-ethylaminodiphenylethane,
4-propylthiopropylamino-4'-propylaminodiphenyl-
  ethane, etc.,
4-methylthiomethylamino-4'-methylaminodiphenyl-
  propane,
4-ethylthioethylamino-4'-methylaminodiphenyl-
  propane,
4-ethylthioethylamino-4'-ethylaminodiphenylpropane,
4-propylthiopropylamino-4'-propylaminodiphenyl-
  propane, etc.,
4-methylthiomethylamino-4'-methylaminodiphenyl-
  butane,
4-ethylthioethylamino-4'-methylaminodiphenylbutane,
4-ethylthioethylamino-4'-ethylaminodiphenylbutane,
4-propylthiopropylamino-4'-propylaminodiphenyl-
  butane,
4-butylthiobutylamino-4'-butylaminodiphenyl-
  butane, etc.,
4-methylthiomethylamino-4'-methylaminodiphenyl-
  amine,
4-ethylthioethylamino-4'-methylaminodiphenylamine,
4-ethylthioethylamino-4'-ethylaminodiphenylamine,
4-propylthiopropylamino-4'-propylaminodiphenyl-
  amine, etc.,
4-methylthiomethylamino-4'-methylaminodiphenyl-
  sulfide,
4-ethylthioethylamino-4'-methylaminodiphenylsulfide,
4-ethylthioethylamino-4'-ethylaminodiphenylsulfide,
4-propylthiopropylamino-4'-propylaminodiphenylsulfide,
  etc.,
4-methylthiomethylamino-4'-methylaminodiphenylether,
4-ethylthioethylamino-4'-methylaminodiphenylether,
4-ethylthioethylamino-4'-ethylaminodiphenylether,
4-propylthiopropylamino-4'-propylaminodiphenylether,
  etc.,
4-phenylthiomethylamino-4'-methylaminodiphenyl-
  methane,
4-phenylthioethylamino-4'-ethylaminodiphenylmethane,
4-tolylthiomethylamino-4'-methylaminodiphenylmethane,
4-tolylthioethylamino-4'-ethylaminodiphenylmethane,
4-xylylthiomethylamino-4'-methylaminodiphenylmethane,
4-xylylthioethylamino-4'-ethylaminodiphenylmethane,
  etc.,
4-phenylthiomethylamino-4'-phenylaminodiphenyl-
  methane,
4-phenylthioethylamino-4'-phenylaminodiphenylmethane,
4-tolylthiomethylamino-4'-phenylaminodiphenylmethane,
4-tolylthioethylamino-4'-phenylaminodiphenylmethane,
  etc.,
4-tolylthiomethylamino-4'-tolylaminodiphenylmethane,
4-tolylthioethylamino-4'-tolylaminodiphenylmethane, etc.,
4-xylylthiomethylamino-4'-phenylaminodiphenylmethane,
4-xylylthioethylamino-4'-xylylaminodiphenylmethane,
  etc.,
4-phenylthiomethylamino-4'-methylaminodiphenylethane,
4-phenylthioethylamino-4'-ethylaminodiphenylethane,
4-tolylthiomethylamino-4'-methylaminodiphenylethane,
4-tolylthioethylamino-4'-ethylaminodiphenylethane,
4-xylylthiomethylamino-4'-methylaminodiphenylethane,
4-xylylthioethylamino-4'-ethylaminodiphenylethane, etc.,
4-phenylthiomethylamino-4'-phenylaminodiphenylethane,
4-phenylthioethylamino-4'-phenylaminodiphenylethane,
4-tolylthiomethylamino-4'-phenylaminodiphenylethane,
4-tolylthioethylamino-4'-phenylaminodiphenylethane,
  etc.,
4-tolylthiomethylamino-4'-tolylaminodiphenylethane,
4-tolylthioethylamino-4'-tolylaminodiphenylethane, etc.,
4-xylylthiomethylamino-4'-phenylaminodiphenylethane,
4-xylylthioethylamino-4'-xylylaminodiphenylethane, etc.,
4-phenylthiomethylamino-4'-methylaminodiphenyl-
  propane,
4-phenylthioethylamino-4'-ethylaminodiphenylpropane,
4-tolylthiomethylamino-4'-methylaminodiphenylpropane,
4-tolylthioethylamino-4'-ethylaminodiphenylpropane,
4-xylylthiomethylamino-4'-methylaminodiphenylpropane,
4-xylylthioethylamino-4'-ethylaminodiphenylpropane,
  etc.,
4-phenylthiomethylamino-4'-phenylaminodiphenyl-
  propane,
4-phenylthioethylamino-4'-phenylaminodiphenylpropane,
4-tolylthiomethylamino-4'-phenylaminodiphenylpropane,
4-tolylthioethylamino-4'-phenylaminodiphenylpropane,
  etc.,
4-tolylthiomethylamino-4'-tolylaminodiphenylpropane,
4-tolylthioethylamino-4'-tolylaminodiphenylpropane, etc.,
4-xylylthiomethylamino-4'-phenylaminodiphenylpropane,
4-xylylthioethylamino-4'-xylylaminodiphenylpropane,
  etc.,
4-phenylthiomethylamino-4'-methylaminodiphenylbutane,
4-phenylthioethylamino-4'-ethylaminodiphenylbutane,
4-tolylthiomethylamino-4'-methylaminodiphenylbutane,
4-tolylthioethylamino-4'-ethylaminodiphenylbutane,
4-xylylthiomethylamino-4'-methylaminodiphenylbutane,
4-xylylthioethylamino-4'-ethylaminodiphenylbutane, etc.,
4-phenylthiomethylamino-4'-phenylaminodiphenylbutane,
4-phenylthioethylamino-4'-phenylaminodiphenylbutane,
4-tolylthiomethylamino-4'-phenylaminodiphenylbutane,
4-tolylthioethylamino-4'-phenylaminodiphenylbutane,
  etc.,
4-tolylthiomethylamino-4'-tolylaminodiphenylbutane,
4-tolylthioethylamino-4'-tolylaminodiphenylbutane, etc.,
4-xylylthiomethylamino-4'-phenylaminodiphenylbutane,
4-xylylthioethylamino-4'-xylylaminodiphenylbutane, etc.,
4-phenylthiomethylamino-4'-methylaminodiphenylamine,
4-phenylthioethylamino-4'-ethylaminodiphenylamine,
4-tolylthiomethylamino-4'-methylaminodiphenylamine,
4-tolylthioethylamino-4'-ethylaminodiphenylamine,
4-xylylthiomethylamino-4'-methylaminodiphenylamine,
4-xylylthioethylamino-4'-ethylaminodiphenylamine, etc.,
4-phenylthiomethylamino-4'-phenylaminodiphenylamine,
4-phenylthioethylamino-4'-phenylaminodiphenylamine,
4-tolylthiomethylamino-4'-phenylaminodiphenylamine,
4-tolylthioethylamino-4'-phenylaminodiphenylamine, etc.,
4-tolylthiomethylamino-4'-tolylaminodiphenylamine,
4-tolylthioethylamino-4'-tolylaminodiphenylamine, etc.,
4-xylylthiomethylamino-4'-phenylaminodiphenylamine,
4-xylylthioethylamino-4'-xylylaminodiphenylamine, etc.,
4-phenylthiomethylamino-4'-methylaminodiphenylsulfide,
4-phenylthioethylamino-4'-ethylaminodiphenylsulfide,
4-tolylthiomethylamino-4'-methylaminodiphenylsulfide,
4-tolylthioethylamino-4'-ethylaminodiphenylsulfide,
4-xylylthiomethylamino-4'-methylaminodiphenylsulfide,
4-xylylthioethylamino-4'-ethylaminodiphenylsulfide, etc.,
4-phenylthiomethylamino-4'-phenylaminodiphenylsulfide,
4-phenylthioethylamino-4'-phenylaminodiphenylsulfide,
4-tolylthiomethylamino-4'-phenylaminodiphenylsulfide,
4 - tolylthioethylamino - 4' - phenylaminodiphenylsulfide,
  etc.,
4-tolylthiomethylamino-4'-tolylaminodiphenylsulfide,
4 - tolylthioethylamino - 4' - tolylaminodiphenylsulfide,
  etc.,
4-xylylthiomethylamino-4'-phenylaminodiphenylsulfide,
4-xylylthioethylamino-4'-xylylaminodiphenylsulfide, etc.,
4-phenylthiomethylamino-4'-methylaminodiphenylether,
4-phenylthioethylamino-4'-ethylaminodiphenylether,
4-tolylthiomethylamino-4'methylaminodiphenylether,
4-tolylthioethylamino-4'-ethylaminodiphenylether,
4-xylylthiomethylamino-4'-methylaminodiphenylether,
4-xylylthioethylamino-4'-ethylaminodiphenylether, etc.,
4-phenylthiomethylamino-4'-phenylaminodiphenylether, 4-phenylthioethylamino-4'-phenylaminodiphenylether,
4-tolylthiomethylamino-4'-phenylaminodiphenylether,
4-tolylthioethylamino-4'-phenylaminodiphenylether, etc.,
4-tolylthiomethylamino-4'-tolylaminodiphenylether,
4-tolylthioethylamino-4'-tolylaminodiphenylether, etc.,
4-xylylthiomethylamino-4'-phenylaminodiphenylether,
4-xylylthioethylamino-4'-xylylaminodiphenylether, etc.

Here again it is understood that these are illustrative and not limiting specific examples, and that the alkyl and/or alkylene (alkoxy) groups may be selected from any of the alkyl and/or alkylene (alkoxy) groups hereinbefore set forth in the present specifications and may contain up to 20 or more carbon atoms each. Also, the aryl group may be selected from phenyl, tolyl, xylyl, ethylphenyl, propylphenyl, butylphenyl, amylphenyl, hexylphenyl, heptylphenyl, octylphenyl, nonylphenyl, decylphenyl, undecylphenyl, dodecylphenyl, etc, napthyl, alkylnapthyl, etc. Again, it is understood that these substitutions may be in the 2,2,2'- or 2,4'-positions.

We claim as our invention:
1. 4,4'-bis-(alkylthioalkylamino)-diphenylmethane.
2. 4-alkylthioalkylamino-4'-aminodiphenylmethane.

References Cited by the Examiner
UNITED STATES PATENTS

| | | | |
|---|---|---|---|
| 2,034,491 | 3/36 | Sloan | 260—570 |
| 2,290,860 | 7/42 | Burk et al. | 252—48.2 X |
| 2,367,264 | 1/45 | Burk et al. | 252—47 |
| 3,035,014 | 5/62 | Popoff et al. | 260—45.9 |

DANIEL E. WYMAN, *Primary Examiner.*

ALPHONSO D. SULLIVAN, *Examiner.*